C. A. ELLIS.
SIGNALING DEVICE FOR VEHICLES.
APPLICATION FILED OCT. 13, 1914.
1,194,490.
Patented Aug. 15, 1916.
2 SHEETS—SHEET 1.
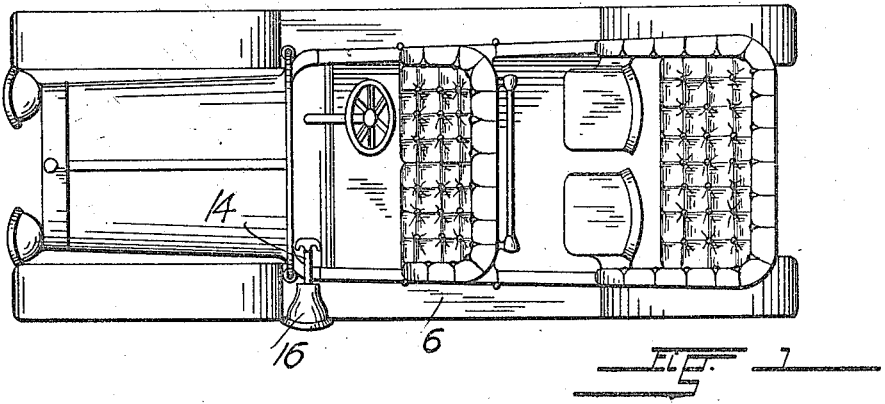
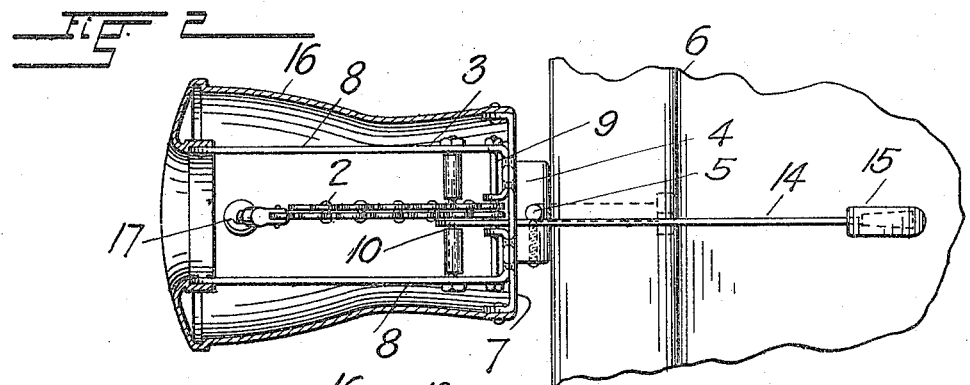
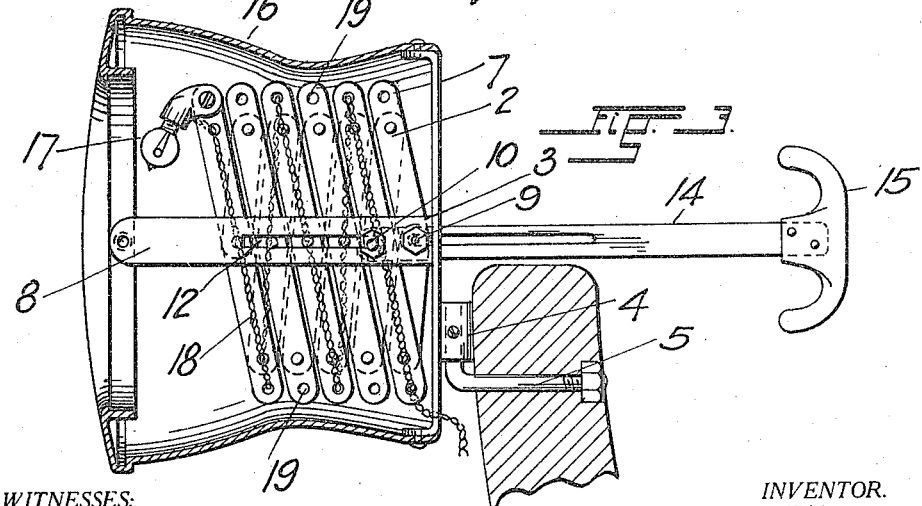
WITNESSES:
INVENTOR.
C. A. Ellis
BY
ATTORNEY.

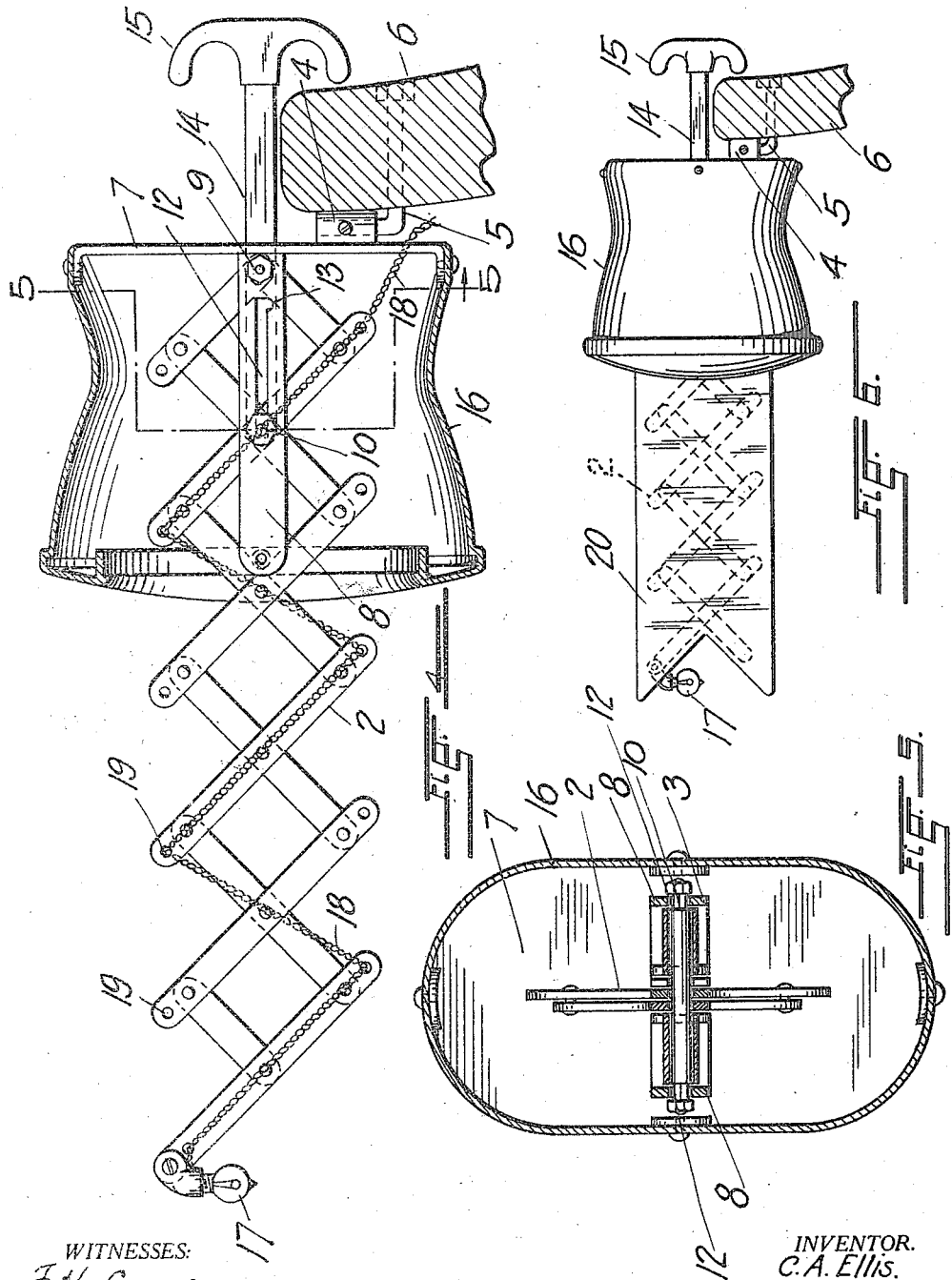

UNITED STATES PATENT OFFICE.

CHARLES A. ELLIS, OF DENVER, COLORADO.

SIGNALING DEVICE FOR VEHICLES.

1,194,490.   Specification of Letters Patent.   Patented Aug. 15, 1916.

Application filed October 13, 1914. Serial No. 866,436.

*To all whom it may concern:*

Be it known that I, CHARLES A. ELLIS, a citizen of the United States, residing at Denver, in the county of Denver and State of Colorado, have invented certain new and useful Improvements in Signaling Devices for Vehicles, of which the following is a specification.

This invention relates to signaling devices for use on automobiles and other vehicles, and its object resides in the provision of a device which by means of a simple adjustment may be projected laterally from a vehicle to which it is attached for the purpose of informing pedestrians, traffic policemen or drivers of other vehicles, that the driver of the approaching vehicle intends to turn the same into a road or street at an angle to that along which it is moving.

My invention includes with this object in view, an extensible signaling element which in its retracted position is concealed in a protective casing fixed at a side of the vehicle and which is constructed to be projected by a simple adjustment of one of its parts.

The element is either painted in a bright, attention-attracting color or provided with a banner of similar hue to render it discernible at a considerable distance, and it carries a small electric lamp to adapt the device for use at night as well as in daytime.

My invention is, in its preferred form, shown in the accompanying drawings, in the various views of which like parts are similarly designated, and in which, Figure 1 is a plan view of a motor driven vehicle showing the signaling device in its operative position, Fig. 2, an enlarged plan view of the device in its retracted condition within the protective casing which has been shown in section, Fig. 3, a side elevation of the device as shown in Fig. 2, Fig. 4, a view similar to Fig. 2 with the indicatory element of the device in its extended position, Fig. 5, a transverse section taken along the line 5—5, Fig. 4, and Fig. 6, an elevation similar to Fig. 4 drawn to a reduced scale, and showing a method of applying a banner to the signaling element.

The invention as illustrated in the drawings comprises an extensible element 2 of the lazy tongs type which at one of its ends is movably mounted in a supporting frame 3 which by means of a sleeve 4 is attached to a bracket 5 extending from a side of the vehicle 6. The frame includes a back plate 7 to which the sleeve 4 is secured, and a pair of outwardly projecting longitudinally slotted arms 8 between which the lazy tongs is operatively mounted. The rearmost pair of the series of levers of which the lazy-tongs is composed are at their point of intersection pivotally secured between the arms 8 by means of a pin or bolt 9, and the pivot pin 10 which connects the next adjoining set of levers at their point of intersection is made of sufficient length to project through the slots 12 in the arms. Nuts applied at the outer ends of the pivot pin and distance sleeve placed around the pins between the arms and the lazy tongs, serve to hold the latter against lateral displacement. The slots in the arms have in their bottom edges at their rearward ends, notches 13 which when the extensible element is in its contracted condition, receive the pivot pin 10 for the purpose of holding the element against accidental outward movement by the jarring motion of the vehicle to which the device is attached.

A longitudinally slotted handle 14 which is slidably positioned in an opening in the back plate 7 bears on the pin 9 which extends through its slot, it is at its outer end pivotally connected with the pivot-pin 10 and it has at its opposite end a knob 15 to facilitate its manipulation.

A protective casing 16 secured on the back plate is formed and proportioned to receive the extensible member in its retracted condition.

To render the device useful at night as well as in day-time, a small electric lamp 17 is secured at the extreme end of the forward lever of the lazy tongs, and connected by means of wires 18, in a circuit with a source of electricity on a vehicle, not shown in the drawings. To prevent tangling of the wires during the outward and inward movement of the lazy tongs, the levers comprised in one of the pivoted series have been extended beyond the points at which they connect with the ends of the levers in the other series, and provided at their extremities with openings 19 through which the wires pass, as is best shown in Fig. 4 of the drawings.

A method of securing a banner to the extensible element has been illustrated in Fig.

6 in which the reference numeral 20 designates a sleeve of suitable flexible material into which the lazy tongs is inserted and with which it is secured by sewing or other method.

The device is usually attached at the left hand side of the vehicle as shown in Fig. 1, to be used only in case the driver contemplates turning into a street or road at his left hand, it being obvious that where the traffic regulations compel drivers of vehicles to keep to the right of vehicles moving in an opposite direction, no signal is required to prevent confusion or accident in case the driver intends to turn into a thoroughfare at his right-hand side. It will be understood however, that if so desired two signaling devices may be applied at opposite sides of the vehicle and that many variations in the construction and arrangement of the parts of which the device is composed may be resorted to without departing from the spirit of my invention as set forth in the following claim:

In a signaling device for vehicles, a supporting element adapted to be secured at a side of a vehicle and including a pair of longitudinally slotted arms, and a signaling element comprising a lazy-tongs pivotally mounted at one of its ends on said supporting element, a pivot pin at the intersection of a pair of the series of levers of which the lazy tongs is formed, said pivot pin extending through the slots of said arms, and a sliding handle connected with said pivot-pin, the said slots having notches to receive the said pin when the lazy tongs is in its contracted condition.

In testimony whereof I have affixed my signature in presence of two witnesses.

CHARLES A. ELLIS.

Witnesses:
 LULA M. ELLIS,
 ELIZABETH E. HOWELL.

Copies of this patent may be obtained for five cents each, by addressing the "Commissioner of Patents, Washington, D. C."